(12) United States Patent
Kleiner et al.

(10) Patent No.: US 11,905,871 B2
(45) Date of Patent: Feb. 20, 2024

(54) METHOD AND APPARATUS FOR ELECTRICALLY HEATING A CATALYTIC CONVERTER

(71) Applicant: Vitesco Technologies GmbH, Regensburg (DE)

(72) Inventors: Florian Kleiner, Munich (DE); Erwin Achleitner, Munich (DE); Hendra Kurniawan, Munich (DE); Soufiane Kolodziej, Munich (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 0 days.

(21) Appl. No.: 18/254,518

(22) PCT Filed: Nov. 11, 2021

(86) PCT No.: PCT/EP2021/081397
§ 371 (c)(1),
(2) Date: May 25, 2023

(87) PCT Pub. No.: WO2022/112014
PCT Pub. Date: Jun. 2, 2022

(65) Prior Publication Data
US 2024/0011423 A1    Jan. 11, 2024

(30) Foreign Application Priority Data

Nov. 27, 2020   (DE) .................... 10 2020 214 911.9
May 31, 2021    (DE) .................... 10 2021 205 533.8

(51) Int. Cl.
*F01N 3/20*     (2006.01)
*F01N 3/32*     (2006.01)
(Continued)

(52) U.S. Cl.
CPC ....... *F01N 3/2026* (2013.01); *B01D 53/9495* (2013.01); *F01N 3/323* (2013.01);
(Continued)

(58) Field of Classification Search
CPC ........ F01N 3/2026; F01N 3/212; F01N 3/035; F01N 3/0814; F01N 3/2013; F01N 3/023;
(Continued)

(56) References Cited

U.S. PATENT DOCUMENTS 5,390,488 A      2/1995  Ament et al. ................... 60/274
5,410,872 A *    5/1995  Adamczyk, Jr. ........ F01N 3/222
                                                        60/276
(Continued)

FOREIGN PATENT DOCUMENTS

DE    4434673 A1    4/1996  ............. B01J 35/00
DE    69409345 T2   7/1998  ............... F01N 3/20
(Continued)

OTHER PUBLICATIONS

Search Report for International Application No. PCT/EP2021/081397, 13 pages, dated Feb. 28, 2022.
(Continued)

*Primary Examiner* — Mark A Laurenzi
*Assistant Examiner* — Dapinder Singh
(74) *Attorney, Agent, or Firm* — Slayden Grubert Beard PLLC

(57) ABSTRACT

Various embodiments of the teachings herein include a method for heating a catalytic converter arranged in an exhaust-gas tract of an internal combustion engine and comprising an electric heating device. An example method may include: activating the electric heating device with a specified heating power at a time before the internal combustion engine is started; monitoring the catalyst temperature in a region of the catalytic converter adjacent the
(Continued)

heating device; before the catalyst temperature has reached a predetermined first threshold value, supplying a secondary air mass flow with a first flow rate is supplied into the exhaust-gas tract upstream of the catalytic converter; and after the catalyst temperature has reached the predetermined first threshold value, increasing the secondary air mass flow to a second flow rate greater than the first flow rate.

10 Claims, 2 Drawing Sheets

(51) Int. Cl.
    *B01D 53/94*     (2006.01)
    *F01N 11/00*     (2006.01)

(52) U.S. Cl.
    CPC .... *F01N 11/002* (2013.01); *B01D 2259/4566* (2013.01); *F01N 2550/22* (2013.01)

(58) Field of Classification Search
    CPC .......... F01N 3/2006; F01N 3/20; F01N 3/027; F01N 3/10; F01N 3/22; F01N 3/30; F01N 9/00; F01N 9/002; F01N 11/00; F01N 11/002; F01N 11/005; F01N 2550/02; F01N 2550/05; F01N 2550/22; F01N 2900/1602; F01N 2900/1404; F01N 2900/0602; F01N 2900/1811; F01N 2900/1621; F01N 2900/0422; F01N 2610/08; F01N 2240/16; F01N 2240/18; B01D 53/9495; B01D 2259/4566; Y02T 10/12; Y02T 10/40

See application file for complete search history.

(56) References Cited

U.S. PATENT DOCUMENTS

| | | | |
|---|---|---|---|
| 6,513,324 B2 | 2/2003 | Brück et al. | ............... 60/300 |
| 11,193,438 B1* | 12/2021 | Zhang | ........... F01N 13/0097 |
| 11,220,942 B2* | 1/2022 | Hupfeld | ............. F01N 3/101 |
| 2011/0283676 A1* | 11/2011 | Reichelderfer | ........... F01N 9/00 |
| | | | 60/299 |
| 2012/0204536 A1* | 8/2012 | Gonze | ............ F01N 3/2033 |
| | | | 60/273 |
| 2019/0063352 A1* | 2/2019 | McKay | ........... F02M 25/0836 |
| 2022/0412278 A1* | 12/2022 | Volmerding | .......... F02D 41/024 |

FOREIGN PATENT DOCUMENTS

| | | | |
|---|---|---|---|
| DE | 19943846 A1 | 3/2001 | ............. B01J 35/04 |
| DE | 102017130695 A1 | 6/2019 | ............. B60W 10/04 |
| DE | 10 2018 217569 | 11/2019 | ............. F01N 9/00 |
| DE | 10 2018 217174 | 4/2020 | ............. F01N 3/08 |
| WO | 2019 033134 | 2/2019 | ............. F01N 3/20 |

OTHER PUBLICATIONS

German Office Action, Application No. 102021205533.8, 6 pages, dated Oct. 20, 2021.

* cited by examiner

METHOD AND APPARATUS FOR ELECTRICALLY HEATING A CATALYTIC CONVERTER

CROSS-REFERENCE TO RELATED APPLICATIONS

This application is a U.S. National Stage Application of International Application No. PCT/EP2021/081397 filed Nov. 11, 2021, which designates the United States of America, and claims priority to DE Application No. 10 2021 205 533.8 filed May 31, 2021 and DE Application No. 10 2020 214 911.9 filed Nov. 27, 2020, the contents of which are hereby incorporated by reference in their entirety.

TECHNICAL FIELD

The present disclosure relates to internal combustion engines. Various embodiments of the teachings herein include methods and/or apparatus for electrically heating a catalytic converter of an internal combustion engine.

BACKGROUND

In motor vehicles with internal combustion engines, ever stricter legal regulations make it necessary, on the one hand, to reduce as far as possible the untreated emissions caused by the combustion of the air/fuel mixture in the cylinders. On the other hand, in internal combustion engines, use is made of exhaust-gas aftertreatment systems which convert the pollutant emissions which are generated during the combustion process of the air/fuel mixture in the cylinders into non-harmful substances.

Catalytic converters are used for this purpose, among other things, in which a chemical conversion of combustion pollutants is carried out by oxidation or reduction of the pollutant in question. For this purpose, catalytic converters have active catalysis regions in which the chemical conversion—catalysis—takes place. The required operating temperature is usually in a fuel- and coating-dependent range starting at around 300° C. to around 600° C. Since the catalysis carried out in the catalysis region generally requires a certain minimum temperature, also known as the light-off temperature or start-up temperature, for effective exhaust-gas aftertreatment, it is necessary to ensure the fastest possible heating of as large a catalyst volume as possible, at least up to the light-off temperature, in view of the expected further reductions in the permitted pollutant emission limits under real driving conditions.

It is therefore necessary to heat the catalytic converter to the desired operating temperature as quickly as possible. For this purpose, on the one hand, combustion measures can be implemented, that is to say measures with which the internal combustion engine is operated such that the waste heat of the internal combustion engine can be used to heat quickly the catalytic converter. However, this generally leads to higher fuel consumption and can only shorten, but not eliminate, the period after a cold start of the internal combustion engine during which the catalytic converter is not yet working and increased pollutant quantities are emitted.

Alternatively or additionally, it is also already known to use electrically heatable catalytic converters. Such catalytic converters have their own electric heating device, which is fed, for example, from the electrical system of a motor vehicle equipped with the internal combustion engine and which can heat the catalytic converter to the desired operating temperature. An advantage of an electrically heatable catalytic converter is that the catalytic converter can be brought to operating temperature in a so-called catalytic converter cold phase even without operation of the internal combustion engine, for example before the internal combustion engine is started. This means that the pollutants are already converted from the moment the internal combustion engine starts. For optimum operation of a catalytic converter, the entire volume of the catalyst substrate, i.e. the entire catalytically effective surface area, must be brought to operating temperature, or at least to the light-off temperature. A larger catalyst volume is required for the conversion of NOx emissions than for the conversion of CO and HC pollutants.

In an electrically heatable catalytic converter (EHC=Electrical Heated Catalyst or E-KAT), the electric heating device is realized, for example, in the form of one or more electrical heating plates through which the gas/exhaust gas can flow, which convert electrical power into heating power and which are arranged in the immediate vicinity of a catalyst substrate that is itself unheated. Since an electric heating plate has a comparatively small volume and the inner surface of the heating plate itself also has a catalytic coating, this catalytic surface is heated up immediately, i.e. on the spot and very quickly.

The design of such electrically heatable catalytic converters is described, for example, in documents DE 199 43 846 A1 and DE 44 34 673 A1. The comparatively small active catalytic surface of the heating plate may be sufficient to reduce the pollutants in this phase to a permissible level, at least in a low-load start-up mode of the internal combustion engine, but the remaining catalyst substrate must also be heated to operating temperature as quickly as possible and as completely as possible. During the heating phase, before the internal combustion engine is started, this is done almost exclusively by thermal radiation, which only permits limited heat transfer. After starting of the internal combustion engine, the heating of the remaining catalyst substrate is supported by the exothermic conversion reaction of the exhaust gases starting in the heating plate.

Document DE 10 2019 219 906 A1 discloses a method for heating a catalytic converter arranged in an exhaust-gas tract of a motor vehicle, in which secondary air can be fed into the exhaust-gas tract upstream of the catalytic converter. When the internal combustion engine is running, the combustion mixture and thus also the exhaust gas can be enriched and secondary air additionally fed in such that the air number A downstream of the catalyst to be heated oscillates around the stoichiometric air number, resulting in an exothermic reaction of the enriched exhaust gas in the catalyst, which contributes to rapid heating of the catalyst substrate.

However, in view of the increasingly frequent start-stop operation of the internal combustion engines and the frequently immediate increase in load after starting, it is desirable to bring as large a volume of the catalyst substrate as possible up to operating temperature, or at least above the light-off temperature, before the internal combustion engine is started in order to ensure complete conversion of the pollutants in the exhaust gas. Simply increasing the heating power is not expedient for this purpose, as it can quickly lead to overheating and thus to damage to the heating plate.

That part of the catalytic converter which lies below the light-off temperature does not contribute to the conversion. The aim of efficient and rapid heating of a catalytic converter is therefore to keep the area below the light-off temperature as small as possible. Furthermore, the heating device, usually the heating plate, should be brought up to the light-off temperature very quickly in order to allow conversion of the exhaust gas components immediately when the internal combustion engine is started.

SUMMARY

Accordingly, the teachings of the present disclosure include methods and/or systems for heating a catalytic converter for an internal combustion engine, the cold-start behavior of which is improved so that it can be operated particularly quickly and efficiently and has improved conversion behavior, in particular in the starting phase of the internal combustion engine. For example, some embodiments include a method for heating a catalytic converter (35) arranged in an exhaust-gas tract (25) of an internal combustion engine (10) and comprising an electric heating device (37), wherein a secondary air mass flow (SLM) can be supplied with the aid of an air conveying device (70) into the exhaust-gas tract (25) at a point upstream of the catalytic converter (35), and the electric heating device (37) is activated with a specified heating power at a time before the internal combustion engine (10) is started, characterized in that the catalyst temperature (KT) in a region of the catalytic converter (35) close to the heating device (37) is monitored and, in a period after the heating device (37) is activated, until the catalyst temperature (KT) has reached a predetermined first threshold value (SW1), no secondary air mass flow (SLM) or a secondary air mass flow (SLM) with a first flow rate is supplied into the exhaust-gas tract (25), and after the catalyst temperature (KT) has reached the predetermined first threshold value (SW1), the secondary air mass flow (SLM) is supplied into the exhaust tract (25) at a second flow rate greater than the first flow rate.

In some embodiments, as soon as the catalyst temperature (KT) reaches an upper limit value (OGW), the heating power of the heating device (37) is reduced to such an extent and subsequently controlled in such a way that the temperature does not fall below a specified operating temperature (AT) of the catalytic converter (35) which is greater than the predetermined first threshold value (SW1) and less than the upper limit value (OGW).

In some embodiments, the catalyst temperature (KT) is greater than or equal to the operating temperature (AT) and after the internal combustion engine (10) has started, the flow rate of the secondary air mass flow (SLM) supplied into the exhaust line (25) is controlled depending on a control sensor (47) arranged downstream of the catalytic converter (35) in the exhaust tract (25) in such a way that an air number, A, present downstream of the catalytic converter (35) approaches the stoichiometric value 1.

In some embodiments, the start-up temperature of the catalytic converter (35) is predetermined as first threshold value (SW1) for the catalyst temperature (KT).

In some embodiments, the first flow rate of the secondary air mass flow (SLM) is set depending on the catalyst temperature (KT) present when the heating device (37) is activated.

In some embodiments, the first delivery rate of the secondary air mass flow (SLM) can be preset to a value between 0.2 kg/h and 5 kg/h, and the second delivery rate of the secondary air mass flow (SLM) can be preset to a value between 10 kg/h and 40 kg/h, depending on the power of the electric heating device (37).

In some embodiments, the air conveying device (70) is electrically drivable and electronically controllable in respect of its conveying capacity by open-loop or closed-loop control.

In some embodiments, the flow rate of the secondary air mass flow (SLM) supplied into the exhaust-gas tract (25) can be varied by means of the electronically controllable flow rate of the electrically drivable air conveying device (70) and/or an electronically actuatable air valve (71).

In some embodiments, the unfired internal combustion engine (10), which is towed by means of an electric machine (50), is used as air conveying means (70).

As another example, some embodiments include an apparatus for heating a catalytic converter (35) arranged in an exhaust-gas tract (25) of an internal combustion engine (10) and comprising an electric heating device (37) and a temperature sensor (45) arranged in a region of the catalytic converter (35) close to the heating device (37), wherein the apparatus comprises an air conveying device (70), with the aid of which a secondary air mass flow (LM) can be supplied into the exhaust-gas tract (25) at a point upstream of the catalytic converter (35), and comprises an electronic control unit (60), which is designed and arranged for controlling a method according to one of the preceding claims.

BRIEF DESCRIPTION OF THE DRAWINGS

Further advantages and embodiments of the methods incorporating teachings of the present disclosure are explained in greater detail by means of the following description of an exemplary embodiment with reference to the drawing. In the drawings.

DETAILED DESCRIPTION

Figure 1:
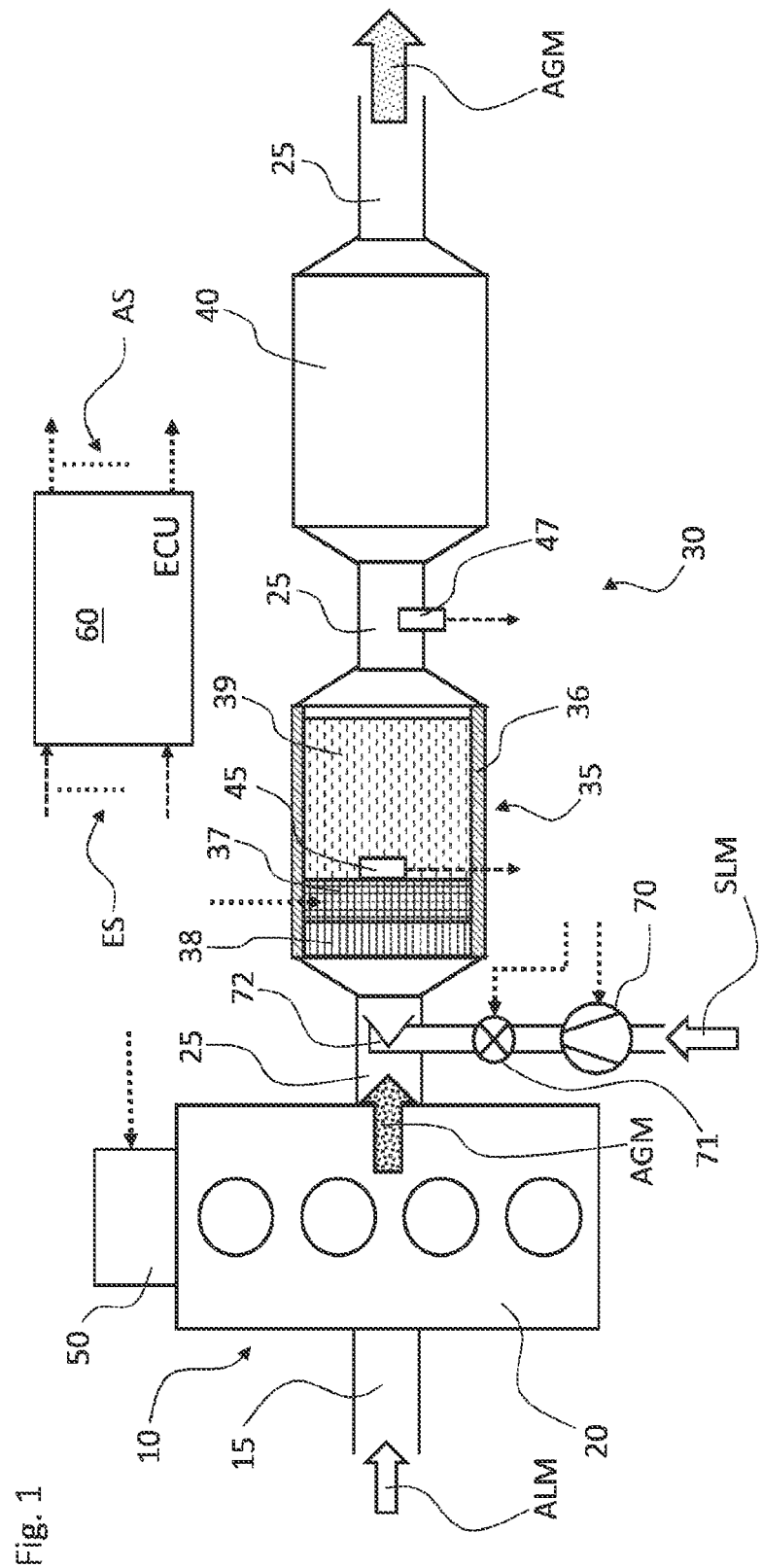
FIG. 1 is a schematic illustration of an internal combustion engine comprising an example exhaust-gas aftertreatment system incorporating teachings of the present disclosure.

The teachings of the present disclosure include methods and/or systems for heating a catalytic converter which is arranged in an exhaust-gas tract of an internal combustion engine and has an electric heating device. In this process, an air conveying device can be used to feed a secondary air mass flow into the exhaust-gas tract at a point upstream of the catalytic converter, and the electric heating device is activated with a specified heating power at a time before the internal combustion engine is started. In a region in the catalytic converter close to the heating device, the catalyst temperature is monitored and, in a period after activation of the heating device until the catalyst temperature has reached a predetermined first threshold value, no secondary air mass flow or a secondary air mass flow with a first flow rate is supplied into the exhaust-gas tract and after the catalyst temperature has reached the predetermined first threshold value, the secondary air mass flow is supplied into the exhaust-gas tract at a second flow rate greater than the first flow rate.

The methods taught herein provides optimum use of the electrical energy to heat the electrically heated catalytic converter (EHC) to such an extent even before the internal combustion engine is started that a high conversion rate of the pollutants is already ensured when the internal combustion engine is started. Compared with conventional methods, a comparatively large active catalyst volume (catalysis region) can be achieved in a short time.

This opens up the possibility of operating the heating device with increased heating power right from the start and before the internal combustion engine is started, without risking overheating and thus thermal damage to the catalytic substrate. This is achieved by supplying no or only a small secondary air mass flow until the first predetermined threshold value of the catalyst temperature is reached, which is set for example in the region of the light-off temperature, in order to ensure that this threshold value is reached as quickly as possible. In this case, the area of the catalytic converter close to the heating device is effectively co-heated by radiation and, if a secondary air mass flow with a first, comparatively low flow rate is present, also by convection.

In order to prevent the temperature of the electric heating device from overshooting while the high heating power continues to be applied, when the predetermined first threshold value of the catalyst temperature is reached, which is in any case predetermined with a safety margin lower than the maximum permissible catalyst temperature, the flow rate of the secondary air mass flow is increased to a significantly higher value than the first flow rate. This increases the convective heat transfer from the heating device to the remaining substrate volume of the catalytic converter at an already elevated temperature and thus a rapid heat input into the catalyst substrate.

The secondary air mass flow improves the thermal coupling between the heating device and the catalyst substrate and thus also the measurement of the catalyst temperature in the area near the heating device. The specification of the flow rate of the secondary air mass flow is, in addition to the electrical heating power, decisive for the size of the activated catalyst volume (catalysis region) at the time of starting the internal combustion engine.

With the aid of the air mass flow introduced into the catalytic converter, the part of the catalytic converter which is above the start-up temperature, typically 300° C., at the time of start-up of the internal combustion engine can be expanded compared with known heating strategies. That part of the catalytic converter which lies below this temperature does not contribute to the conversion. The aim of efficient and rapid heating of a catalytic converter is therefore to keep the area below the start-up temperature as small as possible. Furthermore, the heating device, usually the heating plate, should be brought up to the start-up temperature very quickly in order to enable conversion of the exhaust gas components immediately when the internal combustion engine is started.

In some embodiments, as soon as the catalyst temperature reaches an upper limit value, the heating power of the heating device is reduced to such an extent and subsequently controlled in such a way that the temperature does not fall below a specified operating temperature of the catalytic converter which is greater than the predetermined first threshold value of the catalyst temperature and less than the upper limit value. This ensures that the energy consumption of the heating device is limited to the required level and that no valuable energy, for example from the on-board power supply of a motor vehicle, is wasted.

In some embodiments, when the catalyst temperature is greater than or equal to the operating temperature and after the internal combustion engine has started, the flow rate of the secondary air mass flow supplied into the exhaust-gas tract is controlled depending on a control sensor arranged downstream of the catalytic converter in the exhaust-gas tract in such a way that an air number, A, present downstream of the catalytic converter approaches the stoichiometric value 1. For example, a nitrogen oxide sensor, a lambda sensor or an ammonia sensor arranged downstream of the catalytic converter can serve as the control sensor. In this way, an excess of oxygen in the exhaust gas, which could have a detrimental effect on NOx emissions, is avoided. Furthermore, this makes it possible to keep the catalytic converter at operating temperature during operation of the internal combustion engine in conjunction with a variation in fuel addition without having to draw electrical energy from the vehicle electrical system.

In some embodiments, the start-up temperature or the light-off temperature of the catalytic converter is predetermined as the first threshold value for the catalyst temperature. This ensures that the heating device, which also has a catalytic coating, and the areas of the catalyst substrate close to the heating device quickly reach at least the light-off temperature before the internal combustion engine is started.

In some embodiments, the first flow rate of the secondary air mass flow is set depending on the catalyst temperature present when the heating device is activated. If the internal combustion engine is operated in "start-stop mode", i.e. with frequent intermediate stop phases due to phased coasting operation, all-electric operation or traffic light stops of the motor vehicle, electrical heating often starts at an already higher level than during a cold start. To accelerate the heating process, a higher initial flow rate of the secondary air mass flow can be used here if necessary than during a cold start.

In some embodiments, the first flow rate of the secondary air mass flow can be preset to a value between 0.2 kg/h and 5 kg/h, and the second flow rate of the secondary air mass flow can be preset to a value between 10 kg/h and 40 kg/h, depending on the power of the electric heating device. In principle, a larger first and second flow rate of the secondary air mass flow can also be set for a higher rated power of the heating device and, if necessary, depending on the volume of the catalyst substrate. This makes it possible to optimize the heating process with regard to the design and performance-related boundary conditions of the particular application.

In some embodiments, an electrically drivable air conveying device is used as the air conveying device, the conveying capacity of which can be controlled electronically by open-loop or closed-loop control. This enables economical and precise use and an open-loop or closed-loop-controlled flow rate of the secondary air mass flow.

In some embodiments, the flow rate of the secondary air mass flow supplied into the exhaust-gas tract can be varied by means of an electronically controllable flow rate of the electrically drivable air conveying device and/or an electronically actuatable air valve (71).

In some embodiments, as an alternative to an electrically operated air conveying device, the unfired internal combustion engine itself, which is towed by means of an electric machine, can be used as an air conveying device. This method takes advantage of the fact that a reciprocating engine can also be operated as a compressor, i.e. as a pump, by means of an external drive, in this case for example a starter generator or starter motor coupled to the internal combustion engine anyway. Although an increased expenditure of electrical energy is to be expected here, since the entire internal combustion engine must be towed, no additional unit and no additional installation space are required.

The apparatus described herein may be used for heating a catalytic converter arranged in an exhaust-gas tract of an internal combustion engine, which has an electric heating device and a temperature sensor arranged in a region of the catalytic converter close to the heating device, wherein the apparatus comprises an air conveying device with the aid of which a secondary air mass flow can be supplied into the exhaust-gas tract at a point upstream of the catalytic converter and comprises an electronic control unit which is designed and arranged for controlling a method according to the invention as described above.

In some embodiments, the apparatus may provide optimum use of the electrical energy to heat the electrically heated catalytic converter (EHC) to such an extent even before the internal combustion engine is started that a high conversion rate of the pollutants is already ensured when the internal combustion engine is started. In this way, a comparatively large catalyst volume or catalysis region 39 can be activated in a short time.

Features of the embodiments shown, provided they are not mutually exclusive or are only applicable as alternatives, may individually or in combination supplement and further form the subject matter of the independent claims.

FIG. 1 shows in a schematic illustration an example system incorporating teachings of the present disclosure. FIG. 1 shows an internal combustion engine 10, an electric machine 50 drivingly connected to the internal combustion engine 10, an intake tract 15, an engine block 20 with a plurality of cylinders not specified in greater detail, and an exhaust-gas tract 25 in which an exhaust-gas aftertreatment system 30 is arranged or which extends through the exhaust-gas aftertreatment system 30. An intake air mass flow ALM, which may also be referred to as a primary air mass flow, is supplied to the internal combustion engine 10 via the intake tract 15 and fuel is supplied, for example, via a fuel injection system (not shown here). In the individual cylinders, the fuel is combusted with the intake air mass flow ALM and emitted as an exhaust gas mass flow AGM from the internal combustion engine 10 into the exhaust-gas tract 25.

The exhaust-gas aftertreatment system 30 has, among other things, a catalytic converter 35. With reference to the exhaust gas mass flow AGM downstream of the catalytic converter 35, further exhaust-gas aftertreatment components 40 are also optionally provided in the exhaust-gas tract 25, of which only one is shown by way of example. Possible exhaust-gas aftertreatment components 40 at this point include a three-way catalytic converter, an SCR catalytic converter for selective catalytic reduction, diesel particulate filters, SCR-coated diesel particulate filters, gasoline particulate filters, NOx catalytic converter (LNT lean NOx trap).

The catalytic converter 35 comprises an electrically heatable catalyst and comprises a jacket tube 36 which encloses a catalysis region 39 which has a catalyst substrate. Viewed in the direction of flow of the exhaust gas, an electric heating device 37 is arranged upstream, i.e. in front of the catalysis region 39.

The catalysis region 39 serves for catalytically treating or oxidizing or reducing the exhaust gas of the internal combustion engine 10 that is present in the exhaust-gas tract 25, in order that the exhaust gas can be discharged, substantially free from pollutants, into the surroundings.

In some embodiments, the heating device 37 comprises as a heating plate and can extend completely or almost completely over the diameter of the interior of the jacket tube 36, i.e. over the entire or over almost the entire end face of the catalyst substrate, so that when the heating plate is heated, a large amount of heat energy can be made available for heating the catalysis region 39 or the catalyst substrate and transferred to the catalyst substrate. For fixing the heating device 37, as shown here, for example, a so-called supporting catalyst 38 can be provided upstream of the heating device 37 and supports or carries the heating device 37 or the heating plate.

A temperature sensor 45 is arranged in the catalysis region 39 near the heating device 37 and continuously records the temperature in the catalysis region 39 near the heating device 37 during operation and can thus provide information about the temperature of the catalyst substrate at this point or, in conjunction with model calculations for heat input and temperature distribution, can at least approximately determine the temperature distribution in the catalyst substrate.

In the area of the exhaust-gas tract 25 between the engine block and the catalytic converter 35, i.e. in the exhaust gas mass flow AGM upstream of the catalytic converter 35, an injection point for the secondary air mass flow SLM is provided. The secondary air mass flow SLM is introduced into the exhaust-gas tract 25 by means of an electronically actuatable air conveying device 70, which is usually also electrically driven, and an air supply nozzle 72. An electronically actuatable air valve 71 arranged downstream of the air conveying device 70 is used for additional release and shut-off, or metering, of the secondary air mass flow SLM.

Furthermore, in relation to the exhaust gas mass flow AGM, a control sensor 47 is arranged downstream of the catalytic converter in the exhaust-gas tract 25. The control sensor 47 can preferably be a lambda sensor, but also a nitrogen oxide sensor or an ammonia sensor, for example, which is arranged downstream of the catalytic converter 35. On the basis of the measured values of the control sensor 47, the secondary air mass flow can be controlled in such a way that an air number, A, present downstream of the catalytic converter (35) approaches the stoichiometric value 1.

In some embodiments, the electric machine 50 coupled to the internal combustion engine 10 is, for example, a starter generator or an auxiliary electric motor drive used as part of a hybrid drive solution. This can be used in the case of an unfired internal combustion engine 10, i.e. before it is started, to tow the internal combustion engine 10 and, if necessary, to operate it as an air conveying device 70 in order to draw in a secondary air mass flow SLM via the intake tract 15 and to flush it into the exhaust-gas tract 25.

Furthermore, an electronic control unit (ECU) 60 can receive input signals ES and output signals AS depending on the input signals ES and a working program stored in the control unit 60. Input signals ES are provided, for example, as shown here with dashed arrows, from the temperature sensor 45 and the control sensor 47. Output signals AS, on the other hand, as shown here with dotted arrows, are output to the electric machine 50, the air conveying device 70, the air valve 71 and, last but not least, to the electric heating device 37 for actuation or control thereof. In addition, further actuators and sensors, not shown, may be provided, for example for actuating the internal combustion engine 10 and further components of the exhaust gas system, such as an exhaust gas recirculation system. Thus, at least the heating device 37 as well as the air conveying device 70 and, if applicable, the air valve 71 can be actively actuated by the control unit 60 in accordance with the method according to the invention, depending on the signals from the temperature sensor 45. The electronic control unit 60 may be designed as a separate catalytic converter heating control unit or may be integrated into an engine control unit for the internal combustion engine 10.

If energy is applied to the heating device 37, the heating device warms up and transfers its heat energy to the catalysis region 39 of the catalytic converter 35. According to the invention, the electric heating device 37 is activated with a specified heating power HL at a time before the internal combustion engine 10 is started. At the same time, the catalyst temperature KT in a region of the catalytic converter 35 close to the heating device 37 is monitored by means of the temperature sensor 45.

The determination of the temperature rise in the entire catalysis region 39 can be carried out, for example, by means of modeling, wherein the measured values of the temperature sensor 45 as well as the thermal mass of the catalytic region 39 or of the catalyst substrate and the energy for the evaporation of the water, which is stored in the coating of the catalyst substrate, can be used as input variables of such a model. Then, in a period after the heating device 37 is activated, until the catalyst temperature KT has reached a predetermined first threshold value SW1, no secondary air mass flow SLM or a secondary air mass flow SLM with a first flow rate is supplied into the exhaust-gas tract 25.

A secondary air mass flow SLM supplied in the period until the first threshold value SW1 is reached and having a relatively small flow rate, for example between 0.2 kg/h to 5 kg/h can be conducive to heat transfer to the catalyst substrate and to reliable temperature measurement by means of the temperature sensor 45 in the catalytic converter 35 without significantly slowing down a rapid temperature rise in the heating device 37 itself and in its vicinity in the catalyst substrate.

After the catalyst temperature KT has reached the predetermined first threshold value SW1, which is, for example, at the level of the start-up temperature of the catalysis region 39, for example in the region of 300° C., the secondary air mass flow SLM is supplied into the exhaust-gas tract 25 at a second flow rate, which is significantly increased compared to the first flow rate, in the order of magnitude between 10-40 kg/h.

This results in an increased heat transfer to the catalysis region 39, i.e. the catalyst substrate, and its further accelerated temperature rise of the catalytic converter as a whole, as well as a rapid increase in the volume of the catalyst substrate brought to the start-up temperature or light-off temperature, downstream of the electric heating device 37. The temperature rise in the catalytic converter occurs much more rapidly by this procedure than if the secondary air mass flow is initiated from the beginning with a large flow rate, since the electrical energy at the beginning is used primarily to heat the electric heating device itself, which thus reaches the start-up temperature very quickly, since there is no excessive cooling by heat dissipation. Increased heat transfer due to the increased flow rate of the secondary air mass flow SLM then only occurs at a higher temperature level, which accelerates the heat transfer.

Figure 2:
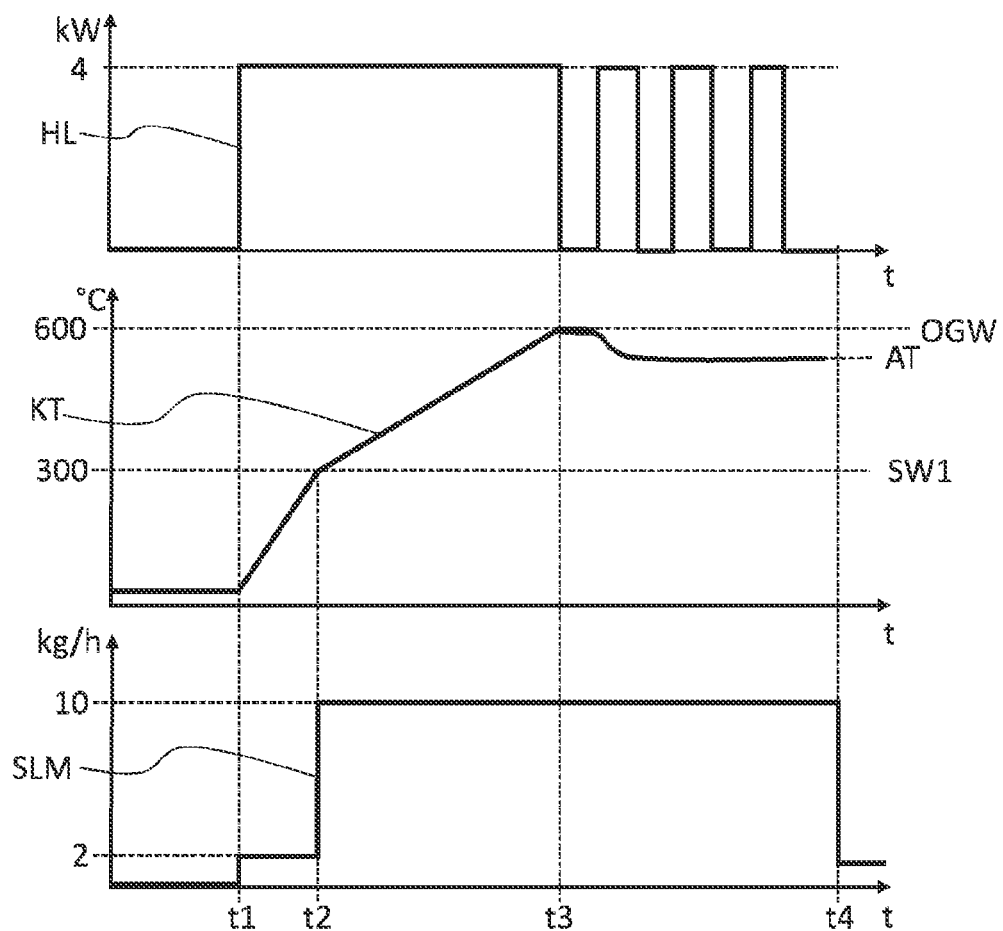
FIG. 2 is a graph of different operating parameters when carrying out an example method incorporating teachings of the present disclosure.

FIG. 2 shows the heating strategy for an example catalytic converter incorporating teachings of the present disclosure on the basis of three chronologically coinciding graphs with the time curves of the relevant operating variables of heating power HL, catalyst temperature KT and flow rate of the secondary air mass flow SLM.

The graph arranged at the top shows the variation over time of the electric power for the electric heating device 37 of the catalytic converter 35, the graph arranged in the middle shows the variation of the catalyst temperature in a region of the catalytic converter 35 close to the heating device 37, and the graph arranged at the bottom shows the variation of the flow rate of the secondary air mass flow SLM.

In some embodiments, a catalytic converter 35 is arranged in an exhaust-gas tract 25 of an internal combustion engine 10 and has an electric heating device 37, wherein a secondary air mass flow SLM can be supplied into the exhaust-gas tract 25 at a point upstream of the catalytic converter 35 with the aid of an air conveying device 70, the catalyst temperature KT in a region of the catalytic converter 35 close to the heating device 37 is monitored, and the electric heating device 37 is activated with a specified heating power HL in time before the internal combustion engine 10 is started.

In the graphs shown in FIG. 2, the period immediately preceding the start of the internal combustion engine 10 is shown. At time t1, the heating device 37 is activated with the specified heating power HL, here for example 4 kW. This time thus marks the start of the method sequence. Prior to this point in time, the heating device 37 is deactivated and the heating power HL shown in the upper graph remains at the value 0. Similarly, up to the point in time t1, the air conveying device 70 is deactivated and the flow rate of the secondary air mass flow remains at the value 0. The catalyst temperature shown in the middle graph is already monitored prior to the point in time t1 or is detected at the latest at the point in time t1 and is at the level of the ambient temperature in the event of a cold start of the internal combustion engine 10, as shown here. However, the catalyst temperature KT can also be at a higher level at time t1 if the internal combustion engine 10 was already in operation shortly beforehand and has not cooled down completely.

The time t1can be triggered by an event that is indicative of an imminent start of the internal combustion engine 10. A corresponding event that can be used for a possible start of the internal combustion engine is, for example, the opening of the driver's door, an opening actuation of the door lock, an occupancy signal of the driver's seat or similar preparatory measures during operation of the internal combustion engine 10 in a motor vehicle. The processing of the corresponding signals and the actuation of the corresponding functions of, for example, the heating device 37 and the air conveying device 70 are performed by means of the electronic control unit 60.

Immediately after activation of the heating device 37, the catalyst temperature KT begins to rise rapidly until, at the end of the first period after activation of the heating device 37, it reaches the predetermined first threshold value SW1 at time t2, which is 300° C. in this example. This corresponds approximately to the activation temperature or the light-off temperature of the catalysis region 39. Depending on the type or design of the catalyst to be heated, the first threshold value SW1 can also be predetermined to be higher or lower.

Also at time t1, the air conveying device 70 is activated, possibly in conjunction with the air valve 71, in such a way that a secondary air mass flow SLM with a first flow rate, in this example 2 kg/h, is supplied into the exhaust-gas tract 25. This advantageously causes an additional convective heat transport from the heating device 37 into the remaining catalysis region 39 without cooling the heating device 37 too much. Depending on the available power of the heating device 37 and/or the starting value of the catalyst temperature KT at time t1 and, if applicable, depending on the overall configuration of the catalytic converter 35, the first flow rate can preferably be specified with a value between 0 (i.e. no secondary air mass flow) and 5 kg/h or even up to 10 kg/h. It is further possible to control the first flow rate of the secondary air mass flow SLM depending on the gradient of the temperature rise of the catalyst temperature KT within the first period (t1 to t2), in order to ensure a uniform rise of the catalyst temperature KT.

Once the catalyst temperature KT has reached the predetermined first threshold value SW1 at time t2, the secondary air mass flow SLM is supplied into the exhaust-gas tract 25 at a second flow rate, which is greater than the first flow rate, in this case for example 10 kg/h, by appropriate electronic actuation of the air conveying device 70, possibly in combination with the air valve 71 by means of the electronic control unit 60. This is shown by the sudden increase in the flow rate of the secondary air mass flow at time t2 in the graph. Depending on the available power of the heating device 37 and, if necessary, depending on the overall configuration of the catalytic converter 35, the second flow rate can preferably be specified with a value between 10 and 40 kg/h or even up to 60 kg/h. It is also possible here to control the first flow rate of the secondary air mass flow SLM depending on the gradient of the temperature rise of the catalyst temperature KT within the second period (t2 to t3), in order to ensure a uniform rise of the catalyst temperature KT.

The corresponding open-loop or closed-loop control of the secondary air mass flow is made possible, for example, by the fact that the air conveying device 70 and/or, if applicable, also the air valve 71 can be driven electrically and can be electronically controlled with regard to their conveying capacity by open-loop or closed-loop control.

While maintaining the constant heating power HL after the increase of the secondary air mass flow SLM at time t2, the catalyst temperature KT continues to rise continuously, according to the example shown. However, due to the increased heat transport by the increased secondary air mass flow SLM into the catalysis region 39, the catalyst temperature KT increases from time t2 with a lower gradient than before until the specified upper limit value OGW of the catalyst temperature is reached at time t3. As a result, there is a rapid increase in the volume of the catalytic region or catalyst substrate that has been heated to the start-up temperature and is thus catalytically active. The level of the default value of the upper limit OGW of the catalyst temperature depends on the design and coating, i.e. on the type and construction of the catalytic converter 35, and in this example is 600° C.

To protect the components of the catalytic converter 35 from thermal damage due to overheating, when the upper limit value OGW of the catalyst temperature KT is reached, the heating power of the heating device 37 is reduced to such an extent and controlled in the following in such a way that a specified operating temperature AT of the catalytic converter 35 is not undershot and the upper limit value OGW is not exceeded, wherein the working temperature KT is greater than the predetermined first threshold value SW1 and less than the upper limit value OGW. Preferably, the working temperature AT is selected so that the catalysis region 39 operates at maximum efficiency. At the same time, the second flow rate of the secondary air mass flow SLM is kept at the set level in order to ensure that the catalysis region 39 is heated through as quickly as possible to the level of the working temperature AT.

The reduction or control of the heating power takes place, for example, by means of a clocked electrical actuation or in the manner of a pulse width modulation (PWM) of the heating device, so that the working temperature AT is maintained or adjusted. This can be seen in the upper graph from time t3. The flow rate of the secondary air mass flow SLM is also maintained at the increased level beyond time t3. As a result, the catalyst temperature KT is reduced or adjusted to the operating temperature AT from time t3.

At time t4, for example, the internal combustion engine is started.

At this time, the catalyst temperature KT is greater than or equal to the working temperature AT or the level of the working temperature. Under these conditions, the flow rate of the secondary air mass flow SLM supplied into the exhaust-gas tract 25 is controlled, depending on the control sensor 47 arranged downstream of the catalytic converter 35 in the exhaust-gas tract 25, so that an air number, λ, present downstream of the catalytic converter 35 approaches the stoichiometric value 1. Following the time t4, i.e. after the start of the internal combustion engine 10, the catalytic converter, in a manner known per se by means of appropriate actuation of the internal combustion engine 10, is maintained at the level of the working temperature AT by the hot exhaust gas mass flow AGM, and the heating power of the heating device 37 can be further reduced or completely deactivated, as shown in the upper graph of FIG. 2.

When using a separate, electrically driven and electronically actuatable air conveying device 70, the flow rate of the secondary air mass flow can be effected by a speed control of the same or by a downstream continuously adjustable air valve 71.

In some embodiments, the air mass flow can be generated by the unfired internal combustion engine 10 itself instead of by a separate air conveying device. In this case, the internal combustion engine 10 is driven, i.e. towed, by an electric machine 50, for example a starter generator or an auxiliary electric drive, and thus operates quasi as a piston compressor. If the internal combustion engine 10 is used as an air conveying device, the flow rate of the secondary air mass flow SLM can be adjusted, for example, by controlling the speed of the electric machine 50. In this case, the secondary air mass flow SLM is introduced into the exhaust-gas tract 25 along the path of the intake air mass flow ALM. In this case, after the internal combustion engine 10 is started, a parallel feed of a secondary air mass flow SLM to control the air number, λ, downstream of the catalytic converter 35 is not possible.

LIST OF REFERENCES

10 Internal combustion engine
15 Intake tract
20 Engine block
25 Exhaust-gas tract
30 Exhaust-gas aftertreatment system
35 Catalytic converter
36 Jacket tube
37 Electric heating device, heating plate
38 Support catalyst
39 Catalytic region
40 Exhaust-gas aftertreatment component
45 Temperature sensor
47 Control sensor
50 Electric machine
60 Electronic control unit (ECU)
70 Air conveying device
71 Air valve
72 Air supply nozzle
ES Input signals
AS Output signals
HL Heating power
KT Catalyst temperature
SW1 First threshold value (of the catalyst temperature)
OGW Upper limit value
AT Working temperature
ALM Intake air mass flow
SLM Secondary air mass flow
AGM Exhaust gas mass flow
t1-t4 Times 1-4

What is claimed is:

1. A method for heating a catalytic converter arranged in an exhaust-gas tract of an internal combustion engine and comprising an electric heating device, the method comprising:
    activating the electric heating device with a specified heating power at a time before the internal combustion engine is started;
    monitoring the catalyst temperature in a region of the catalytic converter adjacent the heating device;
    before the catalyst temperature has reached a predetermined first threshold value, supplying a secondary air mass flow with a first flow rate is supplied into the exhaust-gas tract upstream of the catalytic converter; and
    after the catalyst temperature has reached the predetermined first threshold value, increasing the secondary air mass flow to a second flow rate greater than the first flow rate.

2. The method as claimed in claim 1, further comprising, as soon as the catalyst temperature reaches an upper limit value, reducing the heating power of the heating device that the temperature does not fall below a specified operating temperature of the catalytic converter greater than the predetermined first threshold value and less than the upper limit value.

3. The method as claimed in claim 2, further comprising:
    when the catalyst temperature is greater than or equal to the operating temperature after that internal combustion engine has started, controlling the flow rate of the secondary air mass flow depending on a signal from a control sensor arranged downstream of the catalytic converter in the exhaust tract to adjust an air number, $\lambda$, present downstream of the catalytic converter toward a stoichiometric value of 1.

4. The method as claimed in claim 1, further comprising determining the start-up temperature of the catalytic converter as a first threshold value for the catalyst temperature.

5. The method as claimed in claim 1, wherein, characterized in that the first flow rate of the secondary air mass flow (SLM) is set depending on the catalyst temperature (KT) present when the heating device (37) is activated.

6. The method as claimed in claim 1, wherein:
    the first delivery rate of the secondary air mass flow is between 0.2 kg/h and 5 kg/h; and
    the second delivery rate of the secondary air mass flow is between 10 kg/h and 40 kg/h.

7. The method as claimed in claim 1, wherein the air conveying device is electrically driven and electronically controlled in respect of its conveying capacity by open-loop or closed-loop control.

8. The method as claimed in claim 7, wherein the flow rate of the secondary air mass flow supplied into the exhaust gas tract can be varied by means of the electronically controllable flow rate of the electrically drivable air conveying device and/or an electronically actuatable air valve.

9. The method as claimed in claim 1, wherein the unfired internal combustion engine towed by means of an electric machine provides air conveying.

10. An apparatus for heating a catalytic converter arranged in an exhaust-gas tract of an internal combustion engine, the apparatus comprising:
    an electric heating device; and
    a temperature sensor arranged in a region of the catalytic converter adjacent to the heating device;
    an air conveying device supplying a secondary air mass flow into the exhaust-gas tract at a point upstream of the catalytic converter; and
    an electronic control unit programmed to:
        activate the electric heating device with a specified heating power at a time before the internal combustion engine is started;
        monitor the catalyst temperature in a region of the catalytic converter adjacent the heating device;
        before the catalyst temperature has reached a predetermined first threshold value, suppler a secondary air mass flow with a first flow rate is supplied into the exhaust-gas tract upstream of the catalytic converter; and
        after the catalyst temperature has reached the predetermined first threshold value, increase the secondary air mass flow to a second flow rate greater than the first flow rate.

* * * * *